(12) United States Patent
Ganzel

(10) Patent No.: US 12,115,963 B2
(45) Date of Patent: Oct. 15, 2024

(54) APPARATUS AND METHOD FOR CONTROL OF A HYDRAULIC BRAKE SYSTEM INCLUDING MANUAL PUSHTHROUGH

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

(*) Notice: Subject to any disclaimer, the term of this patent is extended or adjusted under 35 U.S.C. 154(b) by 395 days.

(21) Appl. No.: 17/400,250

(22) Filed: Aug. 12, 2021

(65) Prior Publication Data

US 2023/0048447 A1   Feb. 16, 2023

(51) Int. Cl.
*B60T 8/94* (2006.01)
*B60T 8/176* (2006.01)
(Continued)

(52) U.S. Cl.
CPC .............. *B60T 8/94* (2013.01); *B60T 8/176* (2013.01); *B60T 13/142* (2013.01); *B60T 13/58* (2013.01);
(Continued)

(58) Field of Classification Search
CPC ...... B60T 8/4081; B60T 8/4077; B60T 8/363; B60T 13/74; B60T 13/745; B60T 8/94;
(Continued)

(56) References Cited

U.S. PATENT DOCUMENTS

| 2004/0135432 A1* | 7/2004 | Reuter | B60T 8/4081 |
| | | | 303/152 |
| 2014/0265547 A1* | 9/2014 | Ganzel | B60T 13/745 |
| | | | 303/66 |

(Continued)

FOREIGN PATENT DOCUMENTS

| DE | 102009048286 A1 | 4/2011 |
| DE | 112015003989 T5 | 5/2017 |

(Continued)

OTHER PUBLICATIONS

German Search Report for Corresponding German Application Serial No. 10 2022 208 248.6, dated Apr. 4, 2023, pp. 1-12.

*Primary Examiner* — Pamela Rodriguez
(74) *Attorney, Agent, or Firm* — Kristin L. Murphy

(57) ABSTRACT

A brake system includes a reservoir and a master cylinder operable to provide a brake signal responsive to actuation of a brake pedal connected thereto. The master cylinder is selectively operable to generate brake actuating pressure at an output for hydraulically actuating a pair of hydraulically actuated wheel brakes in a manual push-through operation. A power transmission unit is configured to selectively generate pressurized hydraulic fluid for actuating the pair of hydraulically actuated wheel brakes. First and second two-position three-way valves are hydraulically connected to respective ones of the pair of hydraulically operated brakes and to both the master cylinder and the power transmission unit. The first and second three-way valves each are configured to selectively switch the respective hydraulically (Continued)

operated brake to receive fluid from a selected one of the master cylinder, in a backup braking mode, and the power transmission unit, in a normal non-failure braking mode.

14 Claims, 4 Drawing Sheets

(51) Int. Cl.
    *B60T 8/40*      (2006.01)
    *B60T 13/14*      (2006.01)
    *B60T 13/58*      (2006.01)
    *B60T 13/62*      (2006.01)
    *B60T 13/68*      (2006.01)
    *B60T 15/02*      (2006.01)

(52) U.S. Cl.
    CPC ............ *B60T 13/62* (2013.01); *B60T 13/686* (2013.01); *B60T 15/028* (2013.01); *B60T 8/4081* (2013.01); *B60T 2270/10* (2013.01); *B60T 2270/402* (2013.01); *B60T 2270/404* (2013.01); *B60T 2270/82* (2013.01)

(58) Field of Classification Search
    CPC ........ B60T 8/176; B60T 13/142; B60T 13/58; B60T 13/62; B60T 13/686; B60T 15/028; B60T 2270/10; B60T 2270/402; B60T 2270/404; B60T 2270/82; F16D 2123/00
    See application file for complete search history.

(56) References Cited

U.S. PATENT DOCUMENTS

| | | | |
|---|---|---|---|
| 2016/0159331 A1* | 6/2016 | Yang | B60T 8/4086 |
| | | | 303/15 |
| 2016/0236664 A1* | 8/2016 | Aoki | B60T 8/171 |
| 2017/0217418 A1* | 8/2017 | Ganzel | B60T 8/4086 |
| 2019/0100189 A1* | 4/2019 | Ganzel | B60T 7/042 |
| 2019/0225205 A1* | 7/2019 | Ganzel | B60T 13/745 |
| 2019/0248348 A1* | 8/2019 | Ganzel | B60T 13/745 |
| 2020/0307538 A1 | 10/2020 | Ganzel | |
| 2022/0274572 A1 | 9/2022 | Ganzel | |
| 2023/0001908 A1 | 1/2023 | Einig et al. | |

FOREIGN PATENT DOCUMENTS

| | | |
|---|---|---|
| DE | 102018002989 A1 | 10/2019 |
| WO | 2019/195542 A1 | 10/2019 |

\* cited by examiner

APPARATUS AND METHOD FOR CONTROL OF A HYDRAULIC BRAKE SYSTEM INCLUDING MANUAL PUSHTHROUGH

TECHNICAL FIELD

This disclosure relates to an apparatus and method for control of a brake system and, more particularly, to a method and apparatus of selectively actuating at least one of a pair of front wheel brakes and a pair of rear wheel brakes of a vehicle in a brake system including a manual pushthrough mode.

BACKGROUND

A brake system may include a plurality of wheel brakes and a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include an electronic control unit that can be used to provide a braking command to the wheel brakes, autonomously and/or manually (e.g., via the use of an operator-manipulable brake pedal).

SUMMARY

In an aspect, a brake system for selectively actuating at least one of a pair of front wheel brakes and a pair of rear wheel brakes of a vehicle is disclosed. A selected pair of the front wheel brakes and the rear wheel brakes are hydraulically actuated and an other pair of the front wheel brakes and the rear wheel brakes are electrically actuated. The system has normal non-failure and backup braking modes. The system includes a reservoir and a pair of brake motors for selectively electrically actuating respective left and right wheel brakes of the pair of electrically actuated wheel brakes. A master cylinder is operable to provide a brake signal responsive to actuation of a brake pedal connected thereto. The master cylinder is selectively operable during a manual push-through backup braking mode by actuation of the brake pedal to generate brake actuating pressure at an output for hydraulically actuating the pair of hydraulically actuated wheel brakes in a manual push-through operation. A power transmission unit is in fluid communication with the reservoir and the pair of hydraulically actuated wheel brakes. The power transmission unit is configured to selectively generate pressurized hydraulic fluid for actuating the pair of hydraulically actuated wheel brakes during a normal non-failure braking mode. First and second two-position three-way valves are hydraulically connected to respective ones of the pair of hydraulically operated brakes and to both the master cylinder and the power transmission unit. The first and second three-way valves each are configured to selectively switch the respective hydraulically operated brake to receive fluid from a selected one of the master cylinder, in the backup braking mode, and the power transmission unit, in the normal non-failure braking mode. A first electronic control unit is configured to control the power transmission unit, the first three-way valve, the second three-way valve, and/or at least one of the pair of brake motors responsive to the brake signal.

In an aspect, a brake system for selectively actuating at least one of a pair of front wheel brakes and a pair of rear wheel brakes of a vehicle is disclosed. The front wheel brakes and the rear wheel brakes are hydraulically actuated. The system has normal non-failure and backup braking modes. The system comprises a reservoir and a master cylinder operable to provide a brake signal responsive to actuation of a brake pedal connected thereto. The master cylinder is selectively operable during a manual push-through backup braking mode by actuation of the brake pedal to generate brake actuating pressure at an output for hydraulically actuating a selected one of the pair of front wheel brakes and the pair of rear wheel brakes in a manual push-through operation. A first power transmission unit is in fluid communication with the reservoir and the selected one of the pair of front wheel brakes and the pair of rear wheel brakes. The first power transmission unit is configured to selectively generate pressurized hydraulic fluid for actuating the selected one of the pair of front wheel brakes and the pair of rear wheel brakes during a normal non-failure braking mode. A second power transmission unit is in fluid communication with the reservoir and the other one of the pair of front wheel brakes and the pair of rear wheel brakes. The second power transmission unit is configured to selectively generate pressurized hydraulic fluid for actuating the other one of the pair of front wheel brakes and the pair of rear wheel brakes during a normal non-failure braking mode. First and second two-position three-way valves are hydraulically connected to respective ones of the selected one of the pair of front wheel brakes and the pair of rear wheel brakes and to both the master cylinder and the first power transmission unit. The first and second three-way valves each are configured to selectively switch the respective hydraulically operated brake to receive fluid from a selected one of the master cylinder, in the backup braking mode, and the first power transmission unit, in the normal non-failure braking mode. An electronic control unit is configured to control at least one of the first power transmission unit, the second power transmission unit, the first three-way valve, and the second three-way valve responsive to the brake signal.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

FIGS. 1-4 depict a brake system 100, in first through fourth embodiments, respectively, for selectively actuating at least one of a pair of front wheel brakes and a pair of rear wheel brakes of a vehicle. The brake systems 100 may suitably be used on a ground vehicle, such as an automotive vehicle having four wheels with a wheel brake associated with each wheel. Furthermore, the brake systems 100 can be provided with other braking functions such as anti-lock braking (ABS) and other slip control features to effectively brake the vehicle. Components of the brake systems 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake systems 100, there are four wheel brakes 102A, 102B, 102C, and 102D. The wheel brakes 102A, 102B, 102C, and 102D can have any suitable wheel brake structure operated electrically and/or by the application of pressurized brake fluid. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the selected brake system 100 is installed. A selected pair of the front wheel brakes 102B, 102D and the rear wheel brakes 102A, 102C are hydraulically actuated (as shown, the front wheel brakes 102B, 102D) and an other pair of the front wheel brakes 102B, 102D and the rear wheel brakes 102A, 102C are electrically and/or hydraulically actuated (here, the rear wheel brakes 102A, 102C). The brake system 100 has normal non-failure and backup braking modes.

Figure 1:
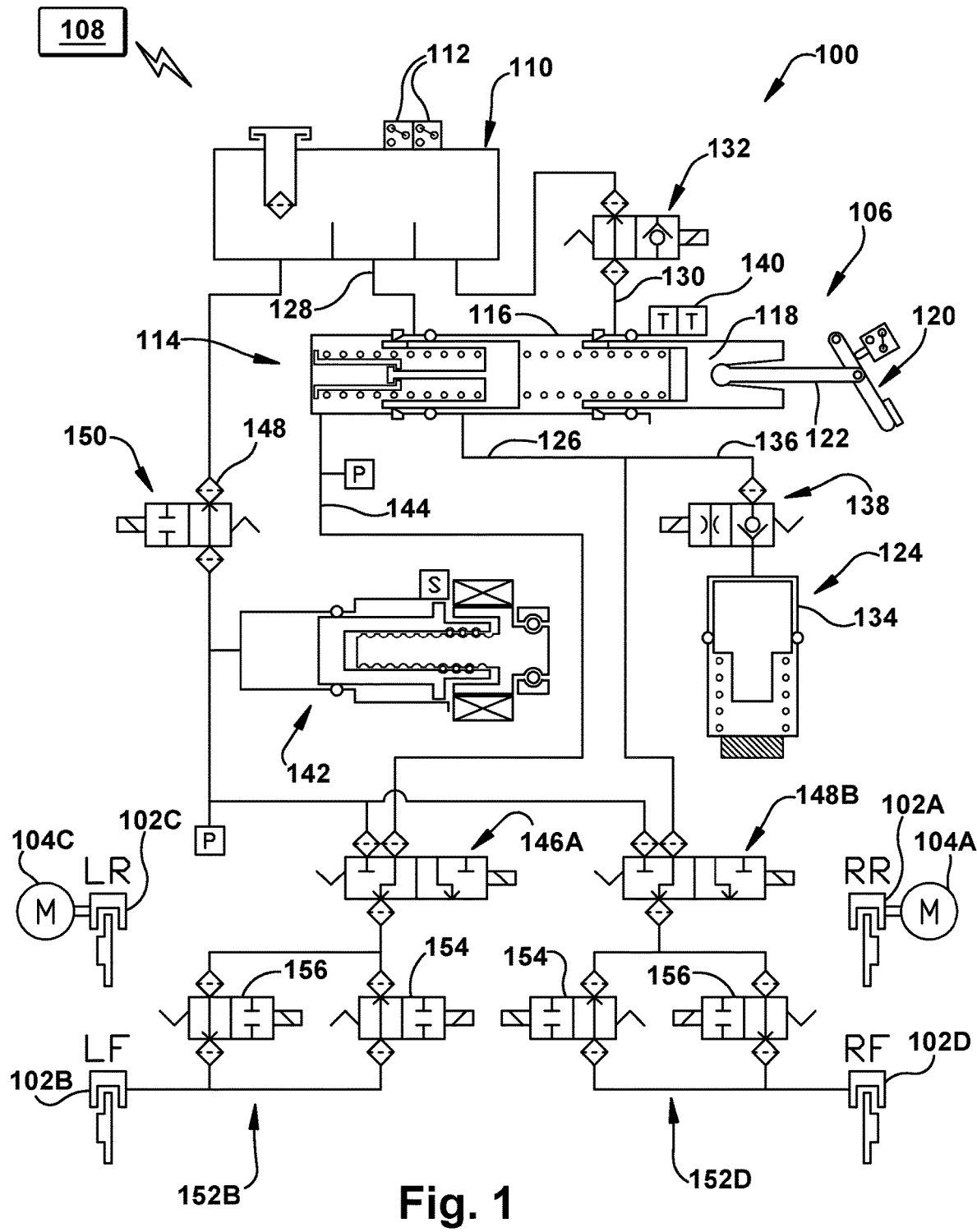
FIG. 1 is a schematic hydraulic diagram of a brake system according to an aspect of the present invention, in a first configuration.
Figure 2:
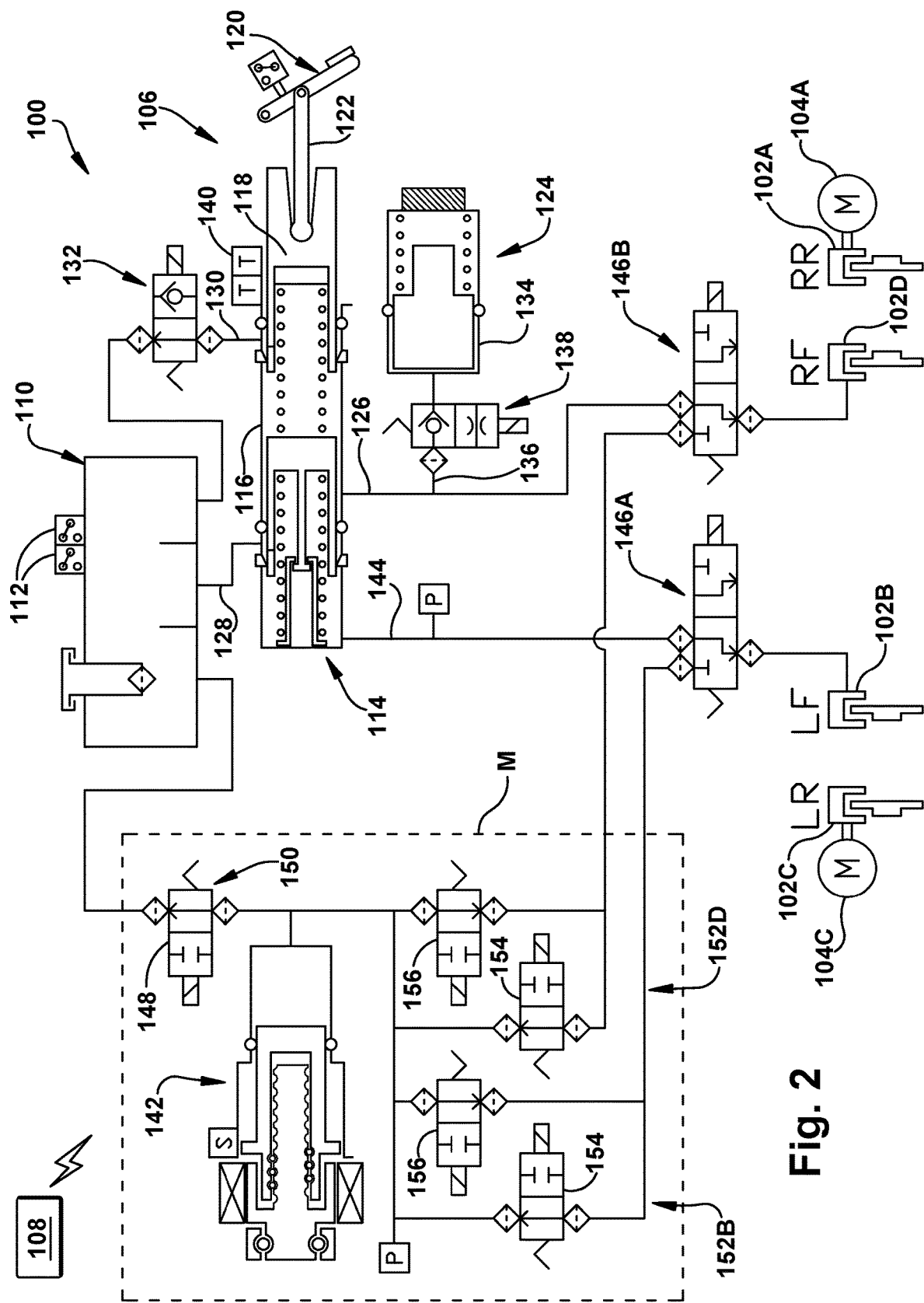
FIG. 2 is a schematic hydraulic diagram of the brake system of FIG. 1, in a second configuration.
Figure 3:
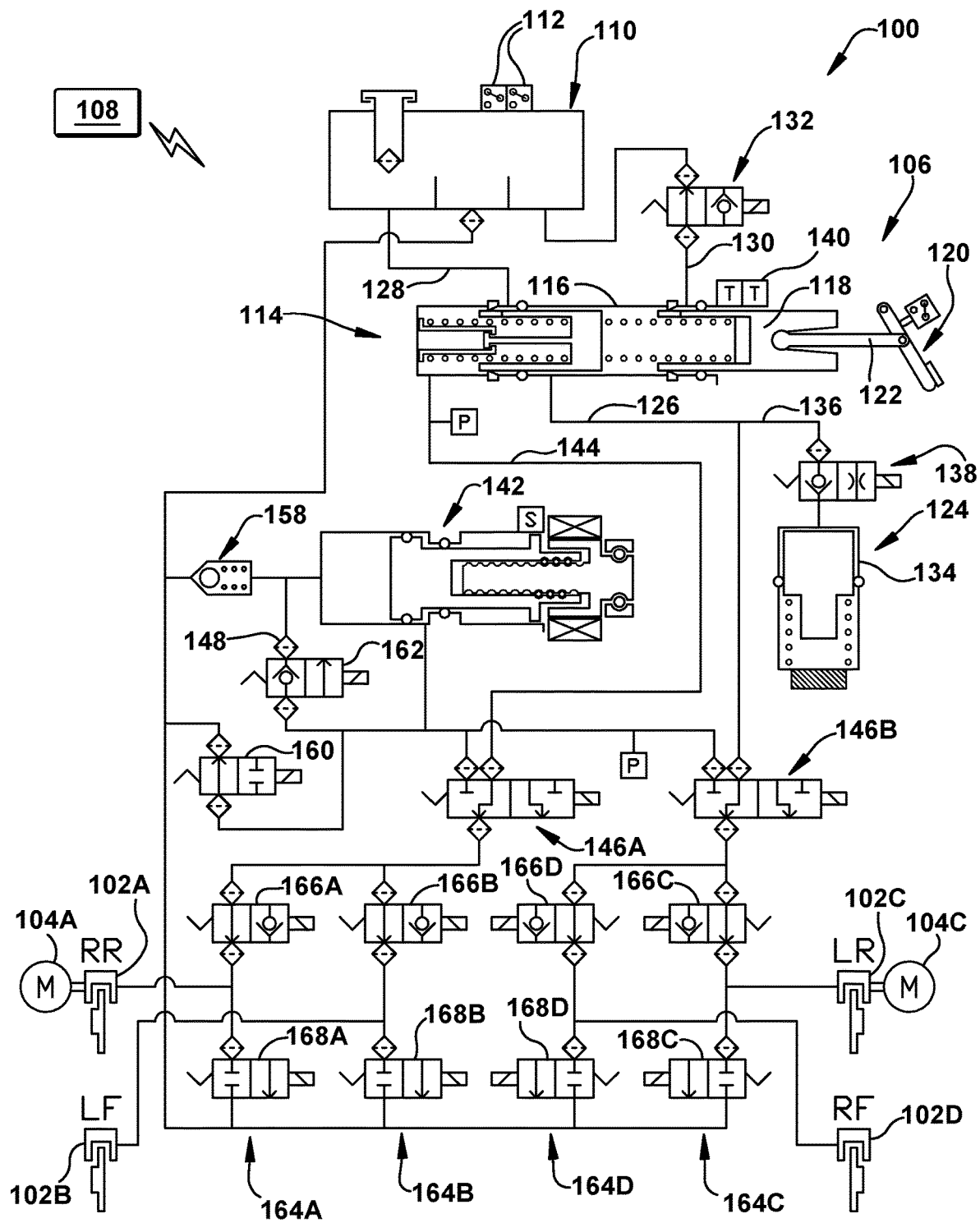
FIG. 3 is a schematic hydraulic diagram of the brake system of FIG. 1, in a third configuration.

As shown in the brake systems 100 of FIGS. 1-3, the front wheel brakes 102B and 102D are hydraulically operated, and the rear wheel brakes 102A and 102C are at least partially electrically operated, such as by including the pair of rear brake motors 104A and 104C for selectively electrically actuating respective left and right rear wheel parking and/or service brakes on the rear wheels, as shown in FIGS. 1-2. However, it is contemplated that either selected pair of the front wheel brakes and the rear wheel brakes may be hydraulic actuated and the other pair of the front wheel brakes and the rear wheel brakes may be electrically actuated, as may be configured by one of ordinary skill in the art for any desired use environment of the brake systems 100. More broadly, when present, a pair of brake motors 102 may be provided for selectively electrically actuating respective left and right wheel brakes 102 of the pair of electrically actuated wheel brakes, regardless of the front/rear position on the vehicle of that pair of electrically actuated wheel brakes.

It is contemplated that the wheel brakes 102A, 102B, 102C, and 102D could each be powered electrically and/or hydraulically—for example, the front wheel brakes 102B and 102D could be electrically powered and the rear wheel brakes 102A and 102C could be hydraulically powered, and/or at least one of the wheel brakes 102A, 102B, 102C, and 102D could be powered electrically during certain phases of operation and hydraulically during other phases of operation, of the same brake system 100, in addition to the potential provision of electrically or hydraulically operated parking brakes to any of the front and/or rear wheels, as desired.

In the example shown in the Figures, the electrically and/or hydraulically operated wheel brake 102A may be associated with a right rear wheel of the vehicle in which the brake system 100 is installed, and the hydraulically operated wheel brake 102B may be associated with the left front wheel. The electrically and/or hydraulically operated wheel brake 102C may be associated with the left rear wheel, and the hydraulically operated wheel brake 102D may be associated with the right front wheel.

The brake systems 100 may include a brake pedal unit, indicated generally at 106, an electronic control unit 108, and a fluid reservoir 110. The reservoir 110 stores and holds hydraulic fluid for the brake system 100. The fluid within the reservoir 110 is preferably held at or about atmospheric pressure, but the fluid may be stored at other pressures if desired. The reservoir 110 is shown schematically having three tanks or sections in FIGS. 1-3, and four tanks or sections in FIG. 4, with fluid conduit lines connected to the tanks or sections. The sections can be separated by several interior walls within the reservoir 110 and are provided to prevent complete drainage of the reservoir 110 in case one of the sections is depleted due to a leakage via one of the two lines connected to the reservoir 110. Alternatively, the reservoir 110 may include multiple separate housings. The reservoir 110 may include at least one fluid level sensor 112 (two shown, for redundancy, with each optionally communicating with a different electronic control unit 108 when multiple ECUs 108 are present) for detecting the fluid level of one or more of the sections of the reservoir 110.

One or more electronic control units ("ECU") 108 are provided to the brake system 100 and may include microprocessors and other electrical circuitry. The ECU 108 receives various signals, process signals, and control the operation of various electrical components of the brake system 100 in response to the received signals, in a wired and/or wireless manner. The ECU 108 can be connected to various sensors such as the reservoir fluid level sensor 112, pressure sensors, travel sensors, switches, wheel speed sensors, and steering angle sensors. The ECU 108 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECU 108 may be connected to the instrument cluster for collecting and supplying information related to warning indicators such as an ABS warning light, a brake fluid level warning light, and a traction control/vehicle stability control indicator light. A second ECU 108 may be provided in situations such as, for example, an at least partially autonomous vehicle.

As shown schematically in FIGS. 1-4, the brake pedal unit 106 includes a master cylinder 114 with an MC housing 116 defining a longitudinally extending bore for slidably receiving various cylindrical pistons and other components therein. Examples of such components are the first and second springs longitudinally extending in series within the bore, as shown in the Figures. Note that the MC housing 116 is not specifically schematically shown in the Figures, but instead the walls of the longitudinally extending bore are schematically illustrated. The MC housing 116 may be formed as a single unit or include two or more separately formed portions coupled together. For some use environments, the master cylinder 114 may be of a tandem or sequential cutoff type.

An MC primary piston 118 is connected with a brake pedal 120 via a linkage arm 122. Leftward movement of the MC primary piston 118 may cause, under certain conditions, a pressure increase within the master cylinder 114.

A brake simulator 124 is in selective fluid communication with the master cylinder 114 for providing predetermined brake pedal response. As shown, the brake simulator 124 is connected to the master cylinder 114 via one or more hydraulic passages, but it is contemplated that the "selective fluid communication" could be provided via integration of the brake simulator 124 into the master cylinder 114.

More specifically, the master cylinder 114 is in fluid communication with the brake simulator 124 via a master cylinder passage 126. The MC primary piston 118 is slidably disposed in the bore of the MC housing 116 When the brake pedal unit 106 is in its rest position (the driver is not depressing the brake pedal 120), the structures of the master cylinder 114 permit fluid communication between the bore of the MC housing 116 and the reservoir 110 via at least one of a reservoir conduit 128 and a test valve conduit 130 The brake simulator 124 is therefore in selective fluid communication with the master cylinder 114 for providing predetermined brake pedal 130 response to the driver (e.g., brake pedal "feel").

The brake system 100 may further include an optional solenoid actuated simulator test valve 132 which may be electronically controlled between an open position and a powered closed position; the simulator test valve 132 may include a test valve spring biasing the simulator test valve 132 toward an open condition. The simulator test valve 132 is located fluidly between the reservoir 110 and the master cylinder 114. The simulator test valve 132 may not be needed during a normal brake apply or for a manual push-through mode. The simulator test valve 132 can be actuated to resist opening under predetermined pressure(s) during various testing modes to determine the correct operation of other components of the brake system 100. For example, the simulator test valve 132 may be actuated to a closed position to prevent venting to the reservoir 110 via the reservoir conduit 128 to monitor fluid flow to determine whether leaks may be occurring through seals of various components of the brake system 100.

A simulation pressure chamber 134 of the brake simulator 124 is in fluid communication with the brake simulator passage 136, which is in fluid communication with the master cylinder 114 of the brake pedal unit 106 via simulator valve 138. One example of desired operation of the simulator valve is during a failed and/or initial/startup condition, in which the brake pedal unit 106 is utilized to provide a source of pressurized fluid to the hydraulically operated ones of the wheel brakes 102A, 102B, 102C, and 102D in a push-through manner, as described herein.

The brake pedal unit 106 is connected to the brake pedal 120 and is actuated by the driver of the vehicle as the driver presses on the brake pedal 120. A brake sensor or switch 140 (two shown at T, for redundancy) may be electrically connected to the ECU 108 to provide a brake signal indicating a depression of the brake pedal 120. That is, the master cylinder 114 is operable to provide a brake signal responsive to actuation of the brake pedal 120 connected thereto. The brake signal may be transmitted from at least one of the brake sensors 140 to the ECU 108 in any desired wired and/or wireless manner.

A power transmission unit 142 is in fluid communication with the reservoir 110 and the pair of hydraulically actuated wheel brakes 102. The power transmission unit 142 is configured to selectively generate pressurized hydraulic fluid for actuating the pair of hydraulically actuated wheel brakes (here, front brakes 102B, 102D) during a normal non-failure braking mode.

Figure 4:
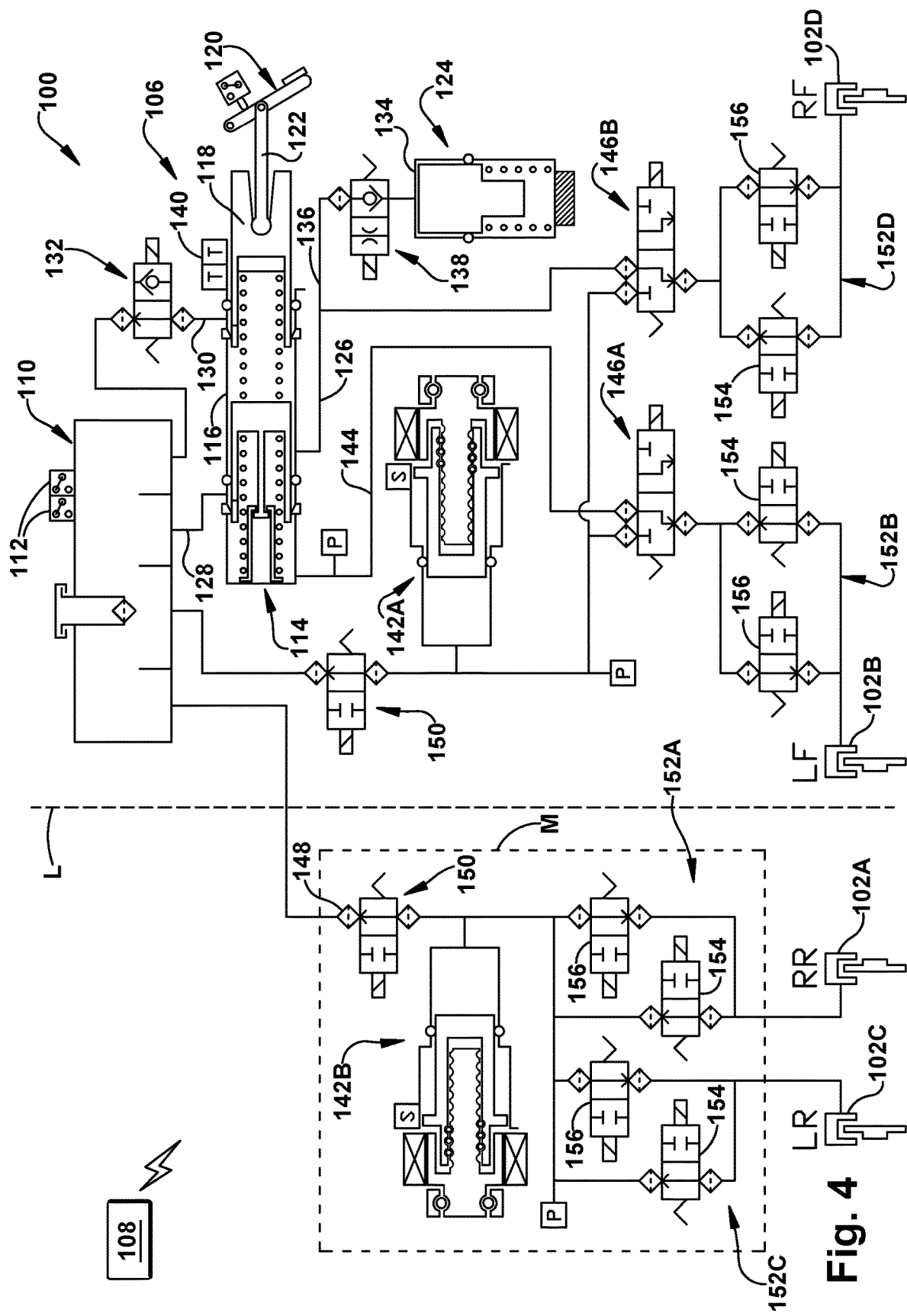
FIG. 4 is a schematic hydraulic diagram of the brake system of FIG. 1, in a fourth configuration.

After a brake apply, fluid from the hydraulically operated ones of the wheel brakes 102A, 102B, 102C, and 102D may be returned to the power transmission unit 142 and/or diverted to the reservoir 110. As shown in FIGS. 1-2 and 4, the power transmission unit 142 may be of the single-acting plunger type. Other suitable types of power transmission units 142 for use in the brake systems 100 shown in the Figures include, but are not limited to, dual-acting plunger type, rack-and-pinion type, and/or the power transmission unit shown and described in copending U.S. patent application Ser. No. 17/400,326, filed concurrently herewith and titled "Power Transmission Unit and Brake Systems Using Same", hereafter referenced as "the Ser. No. 17/400,326 application"), which is incorporated herein by reference in its entirety. It is also contemplated that configurations (not shown) of the brake systems 100 could include hydraulic control of all four wheels, or of the rear wheels instead of the front wheels (which would then be electrically controlled/actuated). One of ordinary skill in the art would be readily able to provide such an arrangement for a desired use environment, following aspects of the present invention.

The brake pedal unit 106 may be used as a back-up source of pressurized fluid to essentially replace the normally supplied source of pressurized fluid from the power transmission unit 142 under certain failed conditions of the brake system 100, and/or upon initial startup of the brake system 100. This situation is referred to as a manual push-through event, or a "manual apply" and may be accomplished during the backup braking mode in coordination with actuation of the rear brake motors 104A, 104C or independently thereof.

In such a push-through mode, the brake pedal unit 106 can supply pressurized fluid to an output (e.g., a master cylinder output 144 and/or the master cylinder passage 126), which is then routed to the hydraulically operated ones of the wheel brakes 102A, 102B, 102C, and 102D as desired. This flow is pushed through, largely under mechanical pressure upon the brake pedal 120 from the driver's foot, from the master cylinder 114. That is, the master cylinder 114 is selectively operable during a manual push-through mode by actuation of the brake pedal 120 connected to the master cylinder 114 to generate brake actuating pressure at least one output (here, schematically shown as master cylinder output 144 and master cylinder passage 126) for hydraulically actuating at least one of the pair of front wheel brakes 102B, 102D and the pair of rear wheel brakes 102A, 102C.

First and second two-position three-way valves 146A and 146B, respectively, are provided to the brake system 100 as shown in the Figures. Each of the first and second three-way valves 146A and 146B is hydraulically connected with the master cylinder 114, the power transmission unit 142, and at least a selected wheel brake of each of the pairs of the front and rear wheel brakes 102. For example, and is shown in the FIGS. 1-2 and 4 the first three-way valve 146A is in fluid communication with the left front wheel brake 102B, and the second three-way valve 146B is in fluid communication with the right front wheel brake 102D. The first and second three-way valves 146A and 146B each are configured to selectively switch the respective hydraulically operated brake (102B and 102D, respectively, as shown in FIGS. 1-3) to receive fluid from a selected one of the master cylinder 114, in the backup braking mode, and the power transmission unit 142, in the normal non-failure braking mode. Through use of the first and second three-way valves 146A and 146B, hydraulic fluid can be routed to the wheel brakes 102 in a desired manner (from either the master cylinder 114 or the power transmission unit 142) to assist with boosted braking control and provide desired response times and efficient pressure flow to the respective wheel brakes 102 associated with each three-way valve.

A single three-way valve 146A or 146B may be used here instead of one normally-closed valve and one normally-open valve for cost and packaging reasons, but also to reduce current draw. This is mainly due to the fact that the normally-open valve would need an undesirably high force spring to avoid it becoming hydraulically locked closed if power is lost during a boosted brake apply, which could trap brake pressure and/or cause unwanted braking when the pedal is released. However, it is contemplated that one normally-closed valve and one normally-open valve could be used instead of the first and/or second three-way valves 146A and 146B, in particular use environments of the brake system 100.

The pair of rear brake motors 104A, 104C may be provided for selectively electrically actuating respective rear wheel brakes 102A and 102C, at least in a parking brake mode which acts in a complementary manner to the hydraulically actuated service brakes 102A, 102C. Whether or not the rear brake motors 104A, 104C function during normal non-failure braking as parking brakes, however, the rear brake motors 104A, 104C could be used in a backup mode as electrically actuated substitutes for a hydraulically operated pair of rear wheel brakes 102A, 102C when hydraulic operation of the rear wheel brakes is not available, for some reason.

The electronic control unit 108 (when a single one is present) is configured to control the power transmission unit 142, the first three-way valve 146A, the second three-way valve 146B, and/or at least one of the pair of brake motors 104A, 104C responsive to the brake signal.

It is also contemplated that, when two electronic control units 108 are provided to the brake system 100, a first electronic control unit 108 may be provided for controlling at least one of the power transmission unit 142, at least one of the first and second three-way valves 146A, 146B, and at least one of the pair of rear brake motors 104 (e.g., in a normal non-failure braking mode), and a second electronic control unit 108 may be provided for controlling at least one of the power transmission unit 142, at least one of the first and second three-way valves 146A, 146B, and at least one of the pair of rear brake motors 104 (e.g., in a backup braking mode), though it is contemplated that a selected one of the electronic control units 108 could control the rear brake motors 104 in both modes of operation. It is also contemplated that the electronic control unit 108 (when at least two are present) which controls the power transmission unit 142 is a different electronic control unit 108 from that which controls the pair of rear brake motors 104, for redundancy.

At least one filter 148 may be provided in any desired position(s) within the brake systems 100. For example, and as shown in the Figures, many of the components of the brake system 100 may include a filter 148 positioned upstream and/or downstream thereof, along a hydraulic line. While example filters 148 are labeled in the Figures, one of ordinary skill in the art will be able to recognize multiple other diamond-shaped filter symbols in the depicted brake systems 100, left unlabeled for clarity of depiction.

It is contemplated that certain configurations of the brake systems 100 may include at least one venting valve 150 located hydraulically between the reservoir 110 and the power transmission unit 142. When present, the venting valve 150 configured to vent at least one wheel brake 102 of the hydraulically operated wheel brakes to the reservoir 110 under predetermined conditions, such as when the wheel brake(s) 102 are not being actuated. If the venting valves 150 is not present, or does not include a check valve function, then the power transmission unit 142 may be able to create a predetermined level of negative pressure ("vacuum") at one or more of the wheel brakes 102. When negative pressure is applied to a wheel brake 102, retraction of the brake pads could result, which may be helpful in selectively reducing brake drag and/or measuring brake pad wear, as desired.

First and second multiplex control valve arrangements 152B, 152D are interposed hydraulically between the power transmission unit 142 and the pair of hydraulically actuated brakes (front brakes 102B, 102D as shown in FIGS. 1-3). The first and second multiplex control valve arrangements 152B, 152D are each controlled by the electronic control unit 108. The first and second Multiplex control valve arrangements 152B, 152D each include respective normally open first and second iso-type valves 154, 156. The first iso-type valve 154 for each multiplex control valve arrangement 152 is located hydraulically between a respective wheel brake 102 and the power transmission unit 142, and the second iso-type valve 156 for each multiplex control valve arrangement 152 is located hydraulically between a respective wheel brake 102 and the power transmission unit 142, for the corresponding wheel brake 102. The first and second iso-type valves 154 and 156 can each block fluid flow in both directions when energized, and are plumbed in parallel and reverse orientations, as shown in the Figures.

As shown in FIG. 1, the first and second multiplex control valve arrangements 152B and 152D may be interposed hydraulically between respective first or second three-way valves 146A, 146B and corresponding ones of the pair of hydraulically actuated brakes (here, left front wheel brake 102B and right front wheel brake 102D, respectively).

Turning now to FIG. 2, the first and second multiplex control valve arrangements 152B and 152D may be interposed hydraulically between the power transmission unit 142 and respective first or second three-way valves 146A, 146B. In the configuration depicted in FIG. 2, the first and second multiplex control valve arrangements 152B and 152D, the power transmission unit 142, and the venting valve (when present) 150 could be co-located (as noted by the dashed line "M") in a modular or unitary component such as, but not limited to, that disclosed in the Ser. No. 17/400,326 application. It is contemplated that the components located inside dashed line "M" in FIG. 2 may be spaced apart in the vehicle, hydraulically if not also mechanically, from components outside that line (i.e., by being located remote from one another within the brake system 100, and at least apart from a common housing or block).

With reference now to FIG. 3, the brake system 100 shown is similar to those in FIGS. 1-2 (and repetitive description will accordingly be omitted), although the pair of electrically operated wheel brakes 102 in the brake system of FIG. 3 are also each configured to be selectively hydraulically operated, to form a pair of electrohydraulically operated wheel brakes 102A, 102C. Each of the pair of electrohydraulically operated wheel brakes 102A, 102C receives fluid from a respective one of the first and second three-way valves 146A, 146B. Additionally, in lieu of the aforementioned multiplex control valve arrangements 152 of FIGS. 1-2 and 4, iso/dump type fluid control is provided by ABS modulator arrangements 164 as shown in FIG. 3.

It is contemplated that, in the brake system 100 shown in FIG. 3, each of the pair of electrohydraulically operated wheel brakes 102A, 102C may receive pressurized hydraulic fluid from a respective one of the first and second three-way valves 146A, 146B which also supplies fluid to a diagonally located one of the (purely) hydraulically operated wheel brakes 102B, 102D. Namely, and as depicted in FIG. 3, the first three-way valve 146A may supply fluid (in both normal non-failure and backup braking modes) to the right rear wheel brake 102A and the left front wheel brake 102B, and the second three-way valve 146AB may supply fluid (in both normal non-failure and backup braking modes) to the left rear wheel brake 102C and the right front wheel brake 102D. Conversely, and in other use environments, it is contemplated that each of the pair of electrohydraulically operated wheel brakes 102A, 102C could instead receive fluid from a respective one of the first and second three-way valves 146A, 146B which also supplies fluid to a selected one of the (purely) hydraulically operated wheel brakes 102B, 102D on the same right/left side of the vehicle as the one of the electrohydraulically operated wheel brakes 102A, 102C on the same three-way valve 146A, 146B.

First and second ABS modulator arrangements 164A, 164C may be interposed hydraulically between the power transmission unit 142 and the pair of electrohydraulically actuated brakes 102A, 102C in the brake system 100 shown in FIG. 3. The first and second ABS modulator arrangements 164A, 164C are each controlled by the electronic control unit 108. The first and second ABS modulator arrangements 164A, 164C each include respective serially arranged first and second iso and dump valves 166 and 168. Similarly, ABS modulator arrangements 164B, 164D each are associated with the (purely) hydraulically actuated ones of the wheel brakes 102B, 102D, and include respective serially arranged iso and dump valves 166 and 168. The iso valve 166 for each ABS modulator arrangement 164 is located hydraulically between a respective wheel brake 102 and the first power transmission unit 142 and the dump valve 168 for each ABS modulator arrangement 164 is located hydraulically between a respective wheel brake 102 and the reservoir 110, for the corresponding wheel brake 102.

The power transmission unit 142 of the brake system 100 of FIG. 3 could be of any desired type, as previously mentioned. As shown in FIG. 3, however, the power transmission unit 142 is of a dual-acting plunger type. A replenishing check valve 158, a venting valve 160, and a normally closed DAP valve 162 may be located fluidically between different output ports of the power transmission unit 142 for assisting with refilling of the power transmission unit 142 under predetermined conditions. The dual-acting plunger type power transmission unit 142 may be, for example, similar to those disclosed in U.S. patent application Ser. No. 17/188,363, filed 1 Mar. 2021 and titled "Apparatus and Method for Control of a Hydraulic Brake System" and U.S. patent application Ser. No. 17/366,623, filed 2 Jul. 2021 and titled "Apparatus and Method for Redundant Control of a Hydraulic Brake System", the entire contents of both of which are incorporated herein by reference.

Turning to FIG. 4, another configuration of the brake system 100 is depicted, parts or all of which can be used with other components or configurations of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

In the arrangement of the brake system 100 shown in FIG. 4, there are no electric brake motors 104 provided and all four of the wheel brakes 102 are hydraulically operated. The portion of the brake system 100 shown to the right of line "L", in the orientation of FIG. 4, is substantially similar to the brake system of FIG. 1, in which the pair of front brakes 102B, 102D are hydraulically actuated. The master cylinder 114 is selectively operable during a manual push-through backup braking mode by actuation of the brake pedal 120 to generate brake actuating pressure at the master cylinder output 144 and/or the master cylinder passage 126 for hydraulically actuating at least a selected one of the pair of front wheel brakes 102B, 102D and the pair of rear wheel brakes 102A, 102C in a manual push-through operation.

A first power transmission unit 142A, similar to the single power transmission unit 142 in the brake system of FIG. 1, is in fluid communication with the reservoir 100 and with the selected one of the pair of front wheel brakes 102B, 102D and the pair of rear wheel brakes 102A, 102C (here, the selected one is shown in FIG. 4 as the pair of front wheel brakes 102B, 102D). The first power transmission unit 142A is configured to selectively generate pressurized hydraulic fluid for actuating the selected one of the pair of front wheel brakes 102B, 102D and the pair of rear wheel brakes 102A, 102C during a normal non-failure braking mode.

A second power transmission unit 142B is shown in FIG. 4 as being in fluid communication with the reservoir 110 and the other one of the pair of front wheel brakes 102B, 102D and the pair of rear wheel brakes 102A, 102C (here, the other one is shown in FIG. 4 as the pair of rear wheel brakes 102A, 102C). The second power transmission unit 142B is configured to selectively generate pressurized hydraulic fluid for actuating the other one of the pair of front wheel brakes 102B, 102D and the pair of rear wheel brakes 102A, 102C during a normal non-failure braking mode.

Like the previously described brake systems 100 of FIGS. 1-2, the brake system 100 of FIG. 4 includes first and second two-position three-way valves 146A, 146B which are hydraulically connected to respective front wheel brakes 102B, 102D and to both the master cylinder 114 and the first power transmission unit 142A, and first and second multiplex control valve arrangements 152B, 152D interposed hydraulically between the first power transmission unit 142A and respective ones of the selected pair of front and rear wheel brakes 102 (here, the front wheel brakes 102B, 102D).

The electronic control unit 108 is configured to control at least one of the first power transmission unit 142A, the second power transmission unit 142B, the first three-way valve 146A, and the second three-way valve 146B responsive to the brake signal.

A second venting valve 150 is located hydraulically between the reservoir 110 and the second power transmission unit 142B. The second venting valve 150 of the brake system 100 of FIG. 4, like the previously discussed venting valve 150 associated with the first power transmission unit 142A, is configured to vent at least one wheel brake 102 of the corresponding wheel brakes 102A, 102C to the reservoir 110 when the at least one wheel brake 102 is in a nonactuated condition.

The brake system 100 of FIG. 4 also may include third and fourth multiplex control valve arrangements 152A, 152C interposed hydraulically between the second power transmission unit 142B and respective ones of the other pair of front and rear wheel brakes 102 (here, the rear wheel brakes 102A, 102C). The third and fourth multiplex control valve arrangements 152A, 152C are each controlled by the electronic control unit 108, and the third and fourth multiplex control valve arrangements 152A, 152C each include respective first and second iso-type valves 154 and 156.

As shown in FIG. 4, and similarly to the description of like components of FIG. 2, the components enclosed by dashed line "M" can be modular or unitary components similar to those disclosed in the Ser. No. 17/400,326 application, and can be spaced apart physically/mechanically and/or hydraulically in the vehicle from the remaining components of the brake system.

It is contemplated that electric parking and/or service brakes could be provided by one of ordinary skill in the art to one or more of the wheel brakes of the brake system 100 of FIG. 4, for a particular use environment.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for selectively actuating at least one of a pair of front wheel brakes and a pair of rear wheel brakes of a vehicle, a selected pair of either the front wheel brakes or the rear wheel brakes being at least partially hydraulically actuated and an other pair of either the front wheel brakes or the rear wheel brakes being at least partially electrically actuated, the system having normal non-failure and backup braking modes, the system comprising:

a reservoir;

a pair of brake motors for selectively electrically actuating respective left and right wheel brakes of the pair of at least partially electrically actuated wheel brakes;

a master cylinder operable to provide a brake signal responsive to actuation of a brake pedal connected thereto, the master cylinder being selectively operable during a manual push-through backup braking mode by actuation of the brake pedal to generate brake actuating pressure at an output for hydraulically actuating at least the selected one of the pairs of front and rear wheel brakes in a manual push-through operation;

a power transmission unit, in fluid communication with the reservoir and at least the selected one of the pairs of front and rear wheel brakes, the power transmission unit being configured to selectively generate pressurized hydraulic fluid for actuating the selected one of the pairs of front and rear wheel brakes during a normal non-failure braking mode;

first and second two-position three-way valves hydraulically connected to respective ones of the selected one of the pairs of front and rear wheel brakes and to both the master cylinder and the power transmission unit, the first and second three-way valves each being configured to selectively switch a respective hydraulically operated brake to receive fluid from a selected one of the master cylinder, in the backup braking mode, and the power transmission unit, in the normal non-failure braking mode;

a first electronic control unit configured to control the power transmission unit, the first three-way valve, the second three-way valve, and/or at least one of the pair of brake motors responsive to the brake signal; and first and second multiplex control valve arrangements interposed hydraulically between the power transmission unit and the selected one of the pairs of front and rear wheel brakes, the first and second multiplex control valve arrangements each being controlled by the first electronic control unit, and the first and second multiplex control valve arrangements each including respective normally open first and second valves.

2. The brake system of claim 1, wherein the first and second multiplex control valve arrangements are interposed hydraulically between respective first or second three-way valves and corresponding ones of the selected one of the pairs of front and rear wheel brakes.

3. The brake system of claim 1, wherein the first and second multiplex control valve arrangements are interposed hydraulically between the power transmission unit and respective first or second three-way valves.

4. The brake system of claim 1, including a venting valve located hydraulically between the reservoir and the power transmission unit, the venting valve being configured to vent at least one wheel brake of the hydraulically operated wheel brakes to the reservoir when the at least one wheel brake is in a nonactuated condition.

5. The brake system of claim 1, including a brake simulator in selective fluid communication with the master cylinder for providing predetermined brake pedal response.

6. The brake system of claim 1, wherein the power transmission unit is a single-acting plunger type.

7. The brake system of claim 1, wherein the master cylinder comprises a tandem master cylinder.

8. The brake system of claim 1, wherein the pair of electrically operated wheel brakes are also each configured to be selectively hydraulically operated, to form a pair of electrohydraulically operated wheel brakes, each of the pair of electrohydraulically operated wheel brakes receiving fluid from a respective one of the first and second three-way valves.

9. The brake system of claim 8, wherein each of the pair of electrohydraulically operated wheel brakes receives fluid from a respective one of the first and second three-way valves which also supplies fluid to a diagonally located one of the hydraulically operated wheel brakes.

10. The brake system of claim 8, wherein each of the pair of electrohydraulically operated wheel brakes receives fluid from a respective one of the first and second three-way valves which also supplies fluid to a selected one of the hydraulically operated wheel brakes on the same right/left side of the vehicle as the one of the electrohydraulically operated wheel brake on the same three-way valve.

11. The brake system of claim 8, wherein the power transmission unit is of a dual-acting plunger type.

12. The brake system of claim 11, including a replenishing check valve, a venting valve, and a normally closed DAP valve located fluidically between different output ports of the power transmission unit for assisting with refilling of the power transmission unit under predetermined conditions.

13. The brake system of claim 1, wherein the first and second valves in each multiplex control valve arrangement are plumbed in reverse orientations from one another.

14. The brake system of claim 1, wherein for each of the first and second multiplex control valve arrangements the first and second valves are arranged in parallel with one another between the respective first or second three-way valves and the corresponding pair of front wheel brakes or rear wheel brakes.

* * * * *